United States Patent
Baron et al.

(10) Patent No.: US 8,409,440 B2
(45) Date of Patent: Apr. 2, 2013

(54) METHOD AND UNIT FOR THE PURIFICATION OF WASTEWATER WITH AEROBIC GRANULAR SLUDGE

(75) Inventors: Marylène Baron, Rueil Malmaison (FR); Sylvie Baig, Montesson (FR)

(73) Assignee: Degremont, Paris la Defense (FR)

( * ) Notice: Subject to any disclaimer, the term of this patent is extended or adjusted under 35 U.S.C. 154(b) by 350 days.

(21) Appl. No.: 12/672,153

(22) PCT Filed: Jul. 30, 2008

(86) PCT No.: PCT/FR2008/001135
§ 371 (c)(1),
(2), (4) Date: Jan. 5, 2011

(87) PCT Pub. No.: WO2009/050347
PCT Pub. Date: Apr. 23, 2009

(65) Prior Publication Data
US 2011/0100904 A1 May 5, 2011

(51) Int. Cl.
C02F 3/30 (2006.01)
(52) U.S. Cl. .......................... 210/605; 210/616; 210/260
(58) Field of Classification Search .................. 210/605, 210/615, 616, 617, 629, 252, 259, 260
See application file for complete search history.

(56) References Cited

U.S. PATENT DOCUMENTS

| | | | |
|---|---|---|---|
| 4,122,013 A | 10/1978 | Greenleaf, Jr. et al. | |
| 4,696,747 A * | 9/1987 | Verstraete et al. | 210/605 |
| 5,616,241 A * | 4/1997 | Khudenko | 210/151 |
| 2001/0027948 A1 | 10/2001 | Tipton et al. | |
| 2003/0173291 A1 | 9/2003 | Schimel | |
| 2006/0243661 A1* | 11/2006 | You et al. | 210/605 |
| 2007/0251881 A1* | 11/2007 | Tokutomi et al. | 210/610 |

FOREIGN PATENT DOCUMENTS
JP 9-70599 A * 3/1997
NL 9301971 A 6/1995

* cited by examiner

*Primary Examiner* — Fred Prince
(74) *Attorney, Agent, or Firm* — Novak Druce Connolly Bove + Quigg LLP

(57) ABSTRACT

The invention relates to a biological wastewater purification method using a reactor including a first compartment (2) and a second compartment (4), the lower parts of which are communicated with one another. The water to be treated enters the first compartment, while the second compartment houses aerobic granular sludge at atmospheric pressure. Oxygen-laden gas is injected into the lower part of the second compartment. The granular sludge forms a bed (5) in the second compartment (4) and the reactor operates in a sequential, discontinuous manner in a cycle comprising two phases, namely: a first anaerobic phase during which the first compartment (2) is vacuum-filled with the water to be treated, after which the pressure is abruptly brought to atmospheric pressure in order to discharge a volume of water rapidly into the second compartment (4); and a second aerobic phase during which gas containing oxygen is injected into the second compartment (4).

11 Claims, 2 Drawing Sheets

METHOD AND UNIT FOR THE PURIFICATION OF WASTEWATER WITH AEROBIC GRANULAR SLUDGE

CROSS REFERENCE TO RELATED APPLICATIONS

This application is a National Phase filing under 35 U.S.C. §371 of PCT/FR2008/001135 filed Jul. 30, 2008, which claims priority to Patent Application No. 0705735, filed in France on Aug. 6, 2007. The entire contents of each of the above-applications are incorporated herein by reference.

The invention relates to a method for the purification of municipal or industrial wastewater in a reactor containing supported or unsupported aerobic granular sludge.

Unsupported aerobic granular sludge is defined as a compact community of mutually aggregated microbial species with a size of between 0.2 and 2 mm, having substantially higher settling velocity than a conventional activated sludge. The settling velocity of the granular sludge in question is at least 10 m/h.

EP-A-0 849 229 describes a method employing a two-compartment reactor for purifying wastewater using unsupported granular sludge. In this method, the wastewater is introduced into a first compartment of the reactor, whereas the granular sludge is introduced into a second compartment. The two compartments communicate with each other in the lower part. An oxygen-containing gas is introduced via the bottom of the second compartment. The granular sludge undergoes an ascending movement thanks to sufficiently powerful aeration. This sludge passes into the unaerated first compartment, which includes a submerged separator from which the treated water is extracted. This reactor has the advantage of allowing operation in continuous mode. However, it operates with internal recirculation of the granular sludge so that no selection pressure can be exerted for ensuring optimum operation with sludge corresponding actually to the definition of aerobic granular sludge.

U.S. Pat. No. 6,793,822 describes a method for producing granular sludge for the purpose of using it in wastewater treatment. According to that method, a bubble column is used and the granulation of the sludge in the wastewater medium requires the following seven operations to be applied in sequence:
 feeding of the reactor containing ungranulated sludge with wastewater;
 aeration with oxygen-containing gas, providing wastewater-sludge mixing;
 nutrient starvation period while aeration continues;
 settling;
 discharge of the treated water;
 repetition of the above steps until obtaining granules having the desired physical properties; and
 recovery of the granules having the desired properties.

Sludge granulation results from a complex balance between biological and physical phenomena, namely the slow growth of the anaerobic biomass, located toward the inside of a granule, and controlled growth of the aerobic biomass simultaneous with the phenomenon of biofilm detachment, the aerobic biomass being located on the periphery of the granules.

WO 2004/024638 describes a method for treating wastewater with aerobic granular sludge operating in three steps: a feed first step, consisting in feeding the reactor containing the granular sludge; a sludge fluidization second step, thanks to the aeration; and a settling third step. This method is also employed in a reactor with air entrainment, the reactor having a height/diameter ratio of 20. Industrial application of this method is limited to low wastewater throughputs since the maximum construction height generally accepted is less than 10 m so that the diameter is limited to about 0.5 m.

The prior art relating to the use of aerobic granular sludge, depending on the types of operation described above, namely in a bubble column and in a reactor with air entrainment, shows that a large reactor height corresponding to a height/diameter ratio at least equal to 5 is necessary to ensure sufficient attrition of the microbial aggregates during aeration and thus to control the size and cohesion of the granules ("*State of art of biogranulation technology for wastewater treatment*" by Y. Liu and J. H. Tay in Biotechnology Advances 22 (2004), pp. 533-563). The attrition allows the subsequent selection of good-quality granules to be maintained in the reactor through the settling velocity. Granules of poor quality settle more slowly and are eliminated in the treated water extraction phase. From a hydraulic standpoint, this type of reactor in the aeration phase can be likened to a perfectly mixed reactor. Granule size control is tied to the degree of turbulence of the medium that determines the shear force applied to the granules and to the duration of this phase which, in addition, must be compatible with the biological reaction rates in the aerobic phase.

In conclusion, the cited documents of the prior art do not allow satisfactory treatment on an industrial scale of wastewater with granular sludge.

One objective of the invention is in particular to provide an optimized method for the biological purification of wastewater using aerobic granular sludge, enabling large throughputs to be efficiently treated under satisfactory economic conditions.

Another objective of the invention is to provide an easily operated purification system, one that can be easily designed and adapted to a wide range of throughputs to be treated and large variations in the quality of the wastewater to be treated, in terms of throughput and amount of pollution to be removed.

According to the invention, the method for the biological purification of wastewater employs a reactor comprising a first compartment and a second compartment which communicate with each other in the lower part, the wastewater to be treated arriving in the first compartment, the second compartment containing aerobic granular sludge and being at atmospheric pressure, and an injection of oxygen-containing gas being provided in the lower part of the second compartment, and is characterized in that:
 the granular sludge forms a bed in the second compartment;
 the reactor is made to operate in sequential batch mode according to a cycle comprising two phases, namely:
 an anaerobic first phase during which:
  the first compartment is filled under vacuum with wastewater to be treated,
  then the pressure in the first compartment is suddenly brought back to atmospheric pressure in order to rapidly discharge a volume of wastewater to be treated into the second compartment in which no injection of oxygen-containing gas takes place and
  the above two operations are repeated several times in order to introduce and distribute a sufficient volume of effluent in pulsed sequential mode in the second compartment, the biological reactions being carried out in an anaerobic medium with the pulsed expanded sludge bed under the effect of the hydraulic stress of the feed;

an aerobic second phase during which:
    the feed of wastewater to be treated is stopped, the shutter of a sludge-concentrating zone being placed in the closed position,
    an injection of oxygen-containing gas takes place in the second compartment, the biological reactions being carried out in an aerobic medium with sludge stirred under the effect of the gas injection,
    the gas injection is stopped and the granular sludge left to rapidly settle and
    the treated wastewater is extracted from the second compartment, the shutter of the sludge-concentrating zone being placed again in the open position;
after which another cycle starts.

Preferably, during the anaerobic first phase, the aerobic granular sludge is selected by separating the unagglomerated sludge in the concentrating zone inside the second compartment and, at the end of the aerobic second phase, the extracted sludge in this concentrating zone is drained.

The gas injected during the second phase is oxygen, or preferably air.

The granular sludge may be introduced preformed into the reactor at the start of operation or it may be produced in situ in a phase prior to the actual treatment of the wastewater.

During the aerobic second phase, the stirring effect may be assisted by means of a mechanical stirrer.

Several second compartments may be associated with one and the same first compartment in order for the wastewater to be treated continuously.

The effluent flow velocity from the first compartment to the second compartment while the first compartment is under atmospheric pressure is preferably greater than 20 m/h. If the mean diameter of the sludge granules has a tendency to decrease, the duration of aeration, and thus the microorganism starvation time, may be reduced during the aerobic phase in order to increase the diameter. The durations of the various steps of the cycle may be adjusted so as to maintain the quality and the quantity of granular sludge. For this purpose, it is possible to provide a sensor for measuring the level of the granular sludge bed, the measurement of which is taken into account for varying the durations of the steps.

In the method according to the invention, the quality and the performance of the aerobic granular sludge are maintained:
    by uniformly distributing the effluent to be treated in the volume of the sludge bed thanks to the pulsed sequential feed during the purification period in an anaerobic medium;
    by making the biological reactions take place in an anaerobic medium with pulsing of the bed in order to promote the formation of a bed with a gradient of particle sizes over the height favorable to gradual separation of the free sludge; and
    by combining the sludge bed pulsing in anaerobic medium with turbulence of the granules in aerobic medium in order to control size distribution of the granules and the properties that result therefrom.

Granulation of the sludge is determined by the coupling of hydrodynamic regimes suitable both in the anaerobic phases and the aerobic phases. In the method according to the invention, the sludge is maintained in "aerobic granular" form by making a selection, such a selection being absent in the method according to EP-A-0 849 229.

The invention also relates to a unit for the biological purification of wastewater, comprising a reactor with a first compartment and a second compartment that communicate with each other in the lower part, the wastewater to be treated arriving in the first compartment, the second compartment containing aerobic granular sludge and being at atmospheric pressure, and a means for injecting oxygen-containing gas being provided in the lower part of the second compartment, characterized in that:
    the reactor is a sequential batch reactor;
    the first compartment is closed at the upper part and may be isolated from the atmosphere;
    vacuum means and pressurizing means are placed in the non-immersed upper zone of the first compartment;
    means for injecting and distributing the wastewater to be treated are positioned in the lower zone in the second compartment,
    and the reactor is designed to operate according to a cycle comprising two phases, namely:
an anaerobic first phase during which:
    the first compartment is filled under vacuum with wastewater to be treated,
    then the pressure in the first compartment is suddenly brought back to atmospheric pressure in order to rapidly discharge a volume of wastewater to be treated into the second compartment in which no injection of oxygen-containing gas takes place and
    the above two operations are repeated several times in order to introduce and distribute a sufficient volume of effluent in pulsed sequential mode in the second compartment, the biological reactions being carried out in an anaerobic medium with the pulsed expanded sludge bed under the effect of the hydraulic stress of the feed;
an aerobic second phase during which:
    the feed of wastewater to be treated is stopped,
    an injection of oxygen-containing gas takes place in the second compartment, the biological reactions being carried out in an aerobic medium with sludge stirred under the effect of the gas injection,
    the gas injection is stopped and the granular sludge left to rapidly settle and
    the treated wastewater is extracted from the second compartment;
after which another cycle starts.

Preferably, the unit includes a sludge concentrator located on the external periphery of the second compartment on the opposite side from the first compartment and provided with an automated shutter or valve. The shutter is closed during the aerobic phase and is opened, at the end of the aerobic phase, in order to remain open during the anaerobic phase.

At least one mechanical stirrer is generally placed in the second compartment.

The unit may include several second compartments associated with one and the same first compartment in order for the wastewater to be treated continuously, with means for bringing each second compartment into communication with the first compartment and/or for isolating each second compartment therefrom.

The invention consists, apart from the arrangements explained above, of a certain number of other arrangements which will be explained in greater detail below with regard to exemplary embodiments described with reference to the appended drawings, which exemplary embodiments are in no way limiting. In these drawings:

FIG. 1 shows an exemplary embodiments of a unit for the biological purification of wastewater in the presence of aerobic granular sludge according to the invention.

Figure 1:
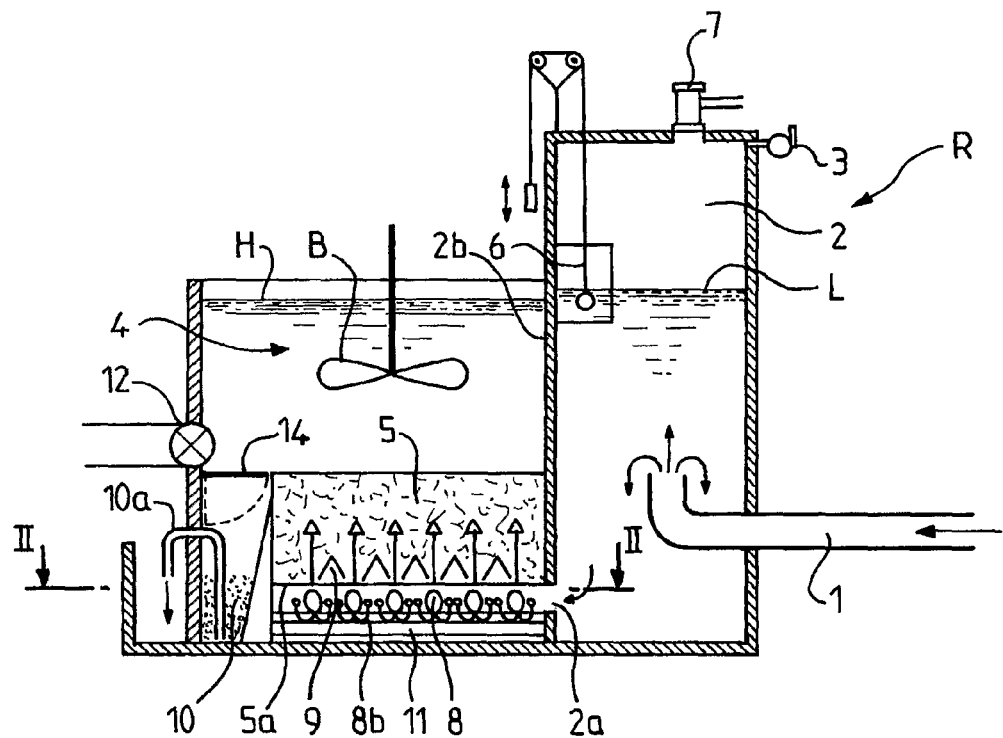
FIG. 1 is a schematic vertical cross section of a unit according to the invention.
Figure 2:
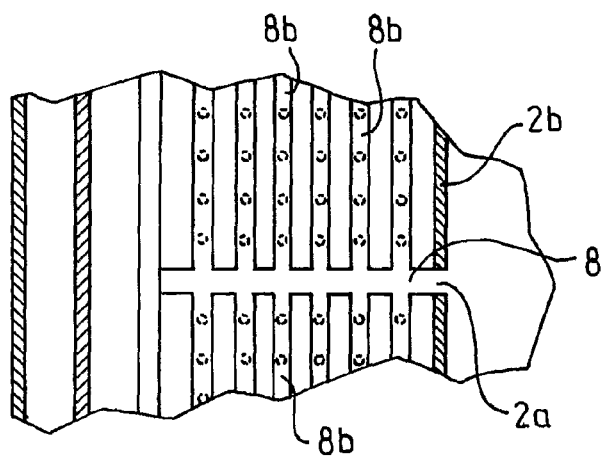
FIG. 2 is a partial schematic cross section on the line II-II of FIG. 1.

The unit comprises a sequential batch reactor R provided with an inlet 1 for injecting the effluent into a bell-shaped first feed compartment 2. This compartment 2 is closed in the upper part and may be isolated from the atmosphere. A vacuum may be created in this upper part using a fan or a booster operating as a vacuum pump 3. Under these conditions, the level L of the raw water gradually rises in the compartment 2 until it reaches a height of 0.6 to 1 m above the level of water H in a second compartment 4, or reaction/separation compartment, which is at atmospheric pressure. The height of the first compartment 2 is greater than that of the second compartment 4.

The overall structure of the reactor R corresponds substantially to that of pulsed settlers constructed and sold by the applicant company and described in particular in "*Memento technique de l'eau*", 10th edition, Degremont Suez, volume 2, pages 844-849. The operation and the application of the reactor R according to the invention differ completely from the settlers in question.

The compartments 2 and 4 communicate with each other via a passage 2a provided in the lower part of a separating partition 2b. The second compartment 4 contains a granular sludge bed 5 deposited on the base of the compartment 4 on a mesh or on a horizontal perforated support 5a. The bed 5 is compacted under the effect of gravity.

An electrical relay (not shown) connected to a level detector 6 controls the sudden opening of a vacuum-breaking valve 7 bringing the upper part of the first compartment 2 into communication with the atmosphere. The wastewater then penetrates the reaction/separation compartment 4 via a pipe 8 from which branch pipes 8b branch off generally orthogonal to the pipe 8, in order to ensure uniform distribution of water beneath the granular sludge bed 5.

The overvelocity created by the operation of the compartment 2 must be sufficient to allow the sludge bed 5 to be fluidized.

The branch pipes 8b are provided with devices for ejecting water with a high velocity (greater than the minimum fluidization velocity) providing the expulsion effect, while calmers 9 ensure that the liquid is properly distributed through the sludge bed, which becomes less compact and expands by 10 to 30%.

The unagglomerated sludge is poured into a concentrator 10 corresponding to a pit with an inclined bottom, from which the sludge is extracted at regular intervals via a pipe 10a and pumping means (not shown). This type of device has the advantage of being able to purge without any risk of affecting the sludge bed. The concentrator is also provided with a shutter device (automated valve) 14 for isolating the concentrator during the aeration phase.

The duration and the frequency of the vacuum and expulsion phases of the first compartment 2 are adjusted so as to distribute the feed of effluent over the time needed for the biological reaction under anaerobic conditions. During this period, the sludge coarsens by assimilating various substrates—carbon, nitrates and sulfates—whereas the sludge bed 5 undergoes alternating vertical movements and increases in volume. The movement of the sludge bed and the creation of interstitial volume promote substrate diffusion and increase the biological reaction rates.

In addition, through the pulsing of the feed, the sludge bed is organized in layers of sludge having different physical properties. The denser granular sludge lies in the lower layers, whereas the unagglomerated particles, corresponding to granules that are being formed or have deflocculated, are distributed on the surface. There is therefore classification.

The concentrator 10 placed in the second compartment is used to recover the granular sludge that does not have the desired physical characteristics.

The granular sludge which is maintained in the sludge bed 5 offers a smaller size distribution and has better cohesion and a substantially improved degree of sphericity.

A rail 11 provided with a system for injecting oxygen-containing gas, especially air, is placed on the bottom of the reaction/separation second compartment 4. The rail 11 may be located above or below the pipes 8, 8b for distributing the wastewater to be treated.

Before the aerobic phase starts, the shutter 14 is in the closed position so as to isolate the concentrator.

The oxygen-containing gas is injected after the first phase of the method, corresponding to a period of reaction in an anaerobic medium while the effluent feed is completed.

During the aerobic second phase, the velocity of the gas injected via the rail 11 must be sufficient to make the granules undergo a turbulent motion necessary for causing the attrition, which is the origin of the detachment of the rapidly growing biofilm.

For the purpose of saving energy, a suitable mechanical stirrer B, for example a propeller stirrer, may supplement the gas injection.

In all cases, the gas simultaneously delivers the oxygen needed for the biological reactions, namely carbon oxidation and nitrification.

Figure 4:
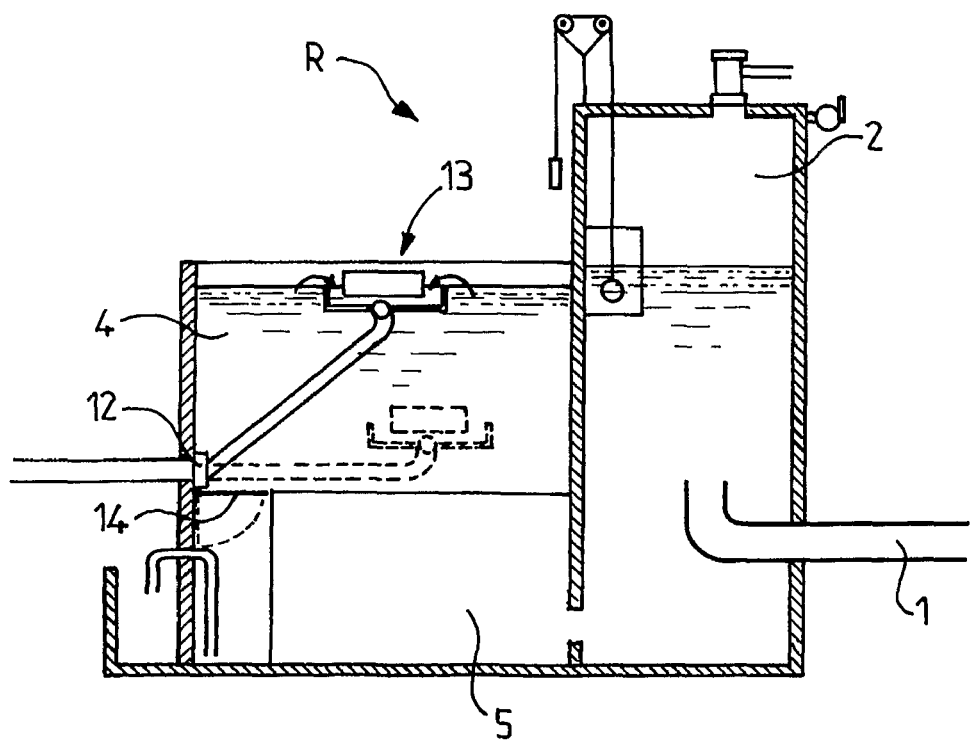
FIG. 4 is a schematic vertical cross section of a floating shovel.

After the aerobic reaction period, the gas injection is stopped. The water purified of carbon, nitrogen, sulfates and phosphorus is extracted via a device 12, such as an overflow or a valve in the top center of the reactor or by a floating overflow 13 (FIG. 4) of the shovel type, connected to the treated water outlet via a pipe articulated on a ball joint.

After the draining sequence, the shutter 14 is opened so as to allow granule selection at the start of the feed.

The unit makes it possible to carry out the following sequence necessary for maintaining the system for treating wastewater with aerobic granular sludge in one and the same reactor with an alternately pulsed and stirred sludge bed, and subjected to selection:

Anaerobic Phase a) pulsed raw water feed; fluidization of the sludge bed.

Stratification and classification of the sludge and removal, via the selector, of the granules with degraded properties, especially in terms of settling and size.

Aerobic Phase b) placing of the system in turbulent or non-turbulent suspension with injection of oxygen-containing gas;
c) settling and discharge of the clarified treated water via the draining valve;
d) extraction of the sludge concentrated in the frequency selector;
e) after the end of the aerobic phase, a new sequence of a) to c) or a) to d).

Repetition of the sequence of biological steps carried out as described above (feed and reaction in anaerobic medium; reaction in aerobic medium; settling and extraction) results in a more selective production of granular sludge. The granular sludge thus obtained is of better quality in terms of:

finer size distribution;
more uniform settling velocity;
more uniform distribution of bacterial populations;
duration of retention in the reactor.

The granular sludge therefore provides enhanced performance linked with the replenishment of the active area exposed to the substrates to be transformed.

Figure 3:
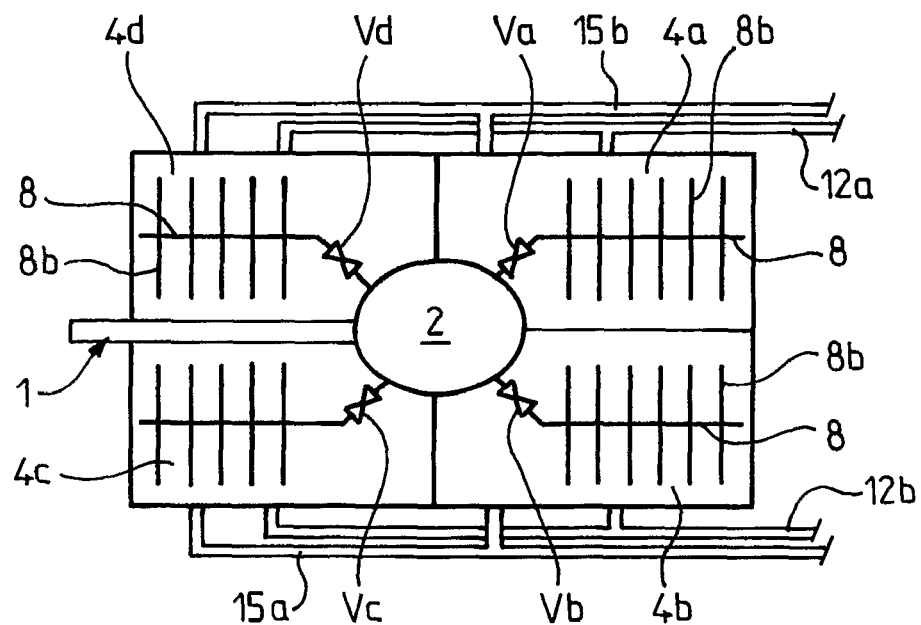
FIG. 3 is a schematic top view of a unit with several second compartments associated with one and the same first compartment.

To provide continuous treatment of wastewater, as illustrated in FIG. 3, several second compartments are placed around one and the same central feed compartment 2. The number of second reaction compartments is calculated according to the effluent residence time. FIG. 3 shows schematically a configuration with four second reaction compartments 4a, 4b, 4c, 4d, the communication of which with the central first compartment being controlled by valves Va, Vb, Vc, Vd. The second compartments may be brought into communication with the first compartment in a circular permutation so as to always ensure that treated water is discharged into the pipes 12a or 12b which join together downstream. The sludge is discharged via the pipes 15a, 15b.

The advantages provided by the method and the unit according to the present invention are considerable. They make it possible to increase the efficiency of the treatment by providing it with great operating flexibility and the ability to be adapted to effluents that differ in quality and in quantity from one another.

Given below is a practical example of the realization and implementation of the invention in the form of a pilot unit, this example having no limiting character.

EXAMPLE

In this example, a reactor was used that had a reaction/separation compartment having a square base with sides of 0.25 m in length and a useful volume of 0.200 m³ for a water height of 3 m. The granular sludge having a mean diameter of 1.8 mm had a concentration of 13 kg/m³. The feed compartment 2 had a water height of 4 m under vacuum.

The effluent to be treated was screened municipal wastewater at a temperature of 22° C. and characterized by the following concentrations:
total chemical oxygen demand, $COD_{total}$: 480 mg/l;
ammoniacal nitrogen, $N-NH_4^+$: 42 mg N/l;
total phosphorus, $P_{total}$: 5 mg/l.

The following treatment sequence was applied per 100 l of treated effluent.

The effluent was introduced with a velocity of 30 m/h into the reaction second compartment 4 in anaerobic medium for a period of 20 minutes under operating cycles of the first compartment 2, or bell, with filling for 35 s and expulsion for 5 s.

Air was then injected into the second compartment 4 with a flow rate of 5 m³/h for a period of 30 minutes.

A 5 minute period of settling was observed before the treated effluent was drained.

The above sequence was repeated 9 times so as to treat 1 m³ of effluent. The analyses carried out on the treated effluent samples showed that the average elimination efficiencies were:
in the case of total chemical oxygen demand, $COD_{total}$: 88%;
in the case of ammoniacal nitrogen, $N-NH_4^+$: 95%;
in the case of total phosphorus, $P_{total}$: 78%;
in the case of overall nitrogen, $N_{overall}$: 70%.

In addition, the variations recorded for each of the above were not significant in relation to the experimental errors in determining the concentrations.

These results illustrate the very good performance of the method and the unit according to the invention for the treatment of typical municipal wastewater.

The invention claimed is:

1. A method for the biological purification of wastewater employing a reactor comprising a first compartment (2) and a second compartment (4) which communicate with each other in the lower part, the wastewater to be treated arriving in the first compartment, the second compartment containing aerobic granular sludge and being at atmospheric pressure, and an injection of oxygen-containing gas being provided in the lower part of the second compartment, wherein:
   the granular sludge forms a bed (5) in the second compartment (4);
   the reactor is made to operate in sequential batch mode according to a cycle comprising two phases, namely:
   an anaerobic first phase during which:
      the first compartment (2) is filled under vacuum with wastewater to be treated,
      then the pressure in the first compartment is suddenly brought back to atmospheric pressure in order to rapidly discharge a volume of wastewater to be treated into the second compartment (4) in which no injection of oxygen-containing gas takes place and
      the above two operations are repeated several times in order to introduce and distribute a sufficient volume of effluent in pulsed sequential mode in the second compartment (4), the biological reactions being carried out in an anaerobic medium with the pulsed expanded sludge bed (5) under the effect of the hydraulic stress of the feed;
   an aerobic second phase during which:
      the feed of wastewater to be treated is stopped, the shutter of a sludge-concentrating zone (10) being placed in the closed position,
      an injection of oxygen-containing gas takes place in the second compartment (4), the biological reactions being carried out in an aerobic medium with sludge stirred under the effect of the gas injection,
      the gas injection is stopped and the granular sludge left to rapidly settle and
      the treated wastewater is extracted from the second compartment,
   the shutter of the sludge-concentrating zone being placed again in the open position;
   after which another cycle starts.

2. The method as claimed in claim 1, wherein, during the anaerobic first phase, the aerobic granular sludge is selected by separating the unagglomerated sludge in the concentrating zone (10) inside the second compartment (4) and, at the end of the aerobic second phase, the extracted sludge in this concentrating zone is drained.

3. The method as claimed in claim 1, wherein the gas injected during the second phase is air.

4. The method as claimed in claim 1, wherein the granular sludge is introduced preformed into the second compartment (4) at the start of operation.

5. The method as claimed in claim 1, wherein the granular sludge is produced in situ in a phase prior to the actual treatment of the wastewater.

6. The method as claimed in claim 1, wherein, during the aerobic second phase, the stirring effect is assisted by means of a mechanical stirrer (B).

7. The method as claimed in claim 1, wherein several second compartments (4a, 4b, 4c, 4d) are associated with one and the same first compartment (2) in order for the wastewater to be treated continuously.

8. A unit for the biological purification of wastewater, comprising a reactor with a first compartment (2) and a second compartment (4) that communicate with each other in the lower part, the wastewater to be treated arriving in the first compartment, the second compartment containing aerobic granular sludge and being at atmospheric pressure, and a means for injecting oxygen-containing gas being provided in the lower part of the second compartment, wherein:

the reactor is a sequential batch reactor;

the first compartment (2) is closed at the upper part and may be isolated from the atmosphere;

vacuum means (3) and pressurizing means (7) are placed in the non-immersed upper zone of the first compartment (2);

means (8, 8b) for injecting and distributing the wastewater to be treated are positioned in the lower zone in the second compartment (4), the reactor being designed to operate according to a cycle comprising two phases, namely:

an anaerobic first phase during which:

the first compartment (2) is filled under vacuum with wastewater to be treated, then the pressure in the first compartment is suddenly brought back to atmospheric pressure in order to rapidly discharge a volume of wastewater to be treated into the second compartment (4) in which no injection of oxygen-containing gas takes place and the above two operations are repeated several times in order to introduce and distribute a sufficient volume of effluent in pulsed sequential mode in the second compartment (4), the biological reactions being carried out in an anaerobic medium with the pulsed expanded sludge bed (5) under the effect of the hydraulic stress of the feed;

an aerobic second phase during which:

the feed of wastewater to be treated is stopped, an injection of oxygen-containing gas takes place in the second compartment (4), the biological reactions being carried out in an aerobic medium with sludge stirred under the effect of the gas injection, the gas injection is stopped and the granular sludge left to rapidly settle and the treated wastewater is extracted from the second compartment after which another cycle starts.

9. The unit as claimed in claim 8, wherein it includes a sludge concentrator (10) located on the external periphery of the second compartment (4) on the opposite side from the first compartment (2) and provided with an automated shutter or valve (14).

10. The unit as claimed in claim 8, wherein at least one mechanical stirrer (B) is placed in the second compartment (4).

11. The unit as claimed in claim 8, wherein it includes several second compartments (4a, 4b, 4c, 4d) associated with one and the same first compartment (2) in order for the wastewater to be treated continuously, with means (Va, Vb, Vc, Vd) for bringing each second compartment into communication with the first compartment and/or for isolating each second compartment therefrom.

* * * * *

UNITED STATES PATENT AND TRADEMARK OFFICE
CERTIFICATE OF CORRECTION

| | | |
|---|---|---|
| PATENT NO. | : 8,409,440 B2 | Page 1 of 1 |
| APPLICATION NO. | : 12/672153 | |
| DATED | : April 2, 2013 | |
| INVENTOR(S) | : Baron | |

It is certified that error appears in the above-identified patent and that said Letters Patent is hereby corrected as shown below:

On the title page, insert

Item --[30]       Foreign Application Priority Data

August 6, 2007  (FR) .................. 07 05735--

Signed and Sealed this
Thirteenth Day of May, 2014

Michelle K. Lee
*Deputy Director of the United States Patent and Trademark Office*